United States Patent [19]

Saugeon et al.

[11] Patent Number: 4,829,491

[45] Date of Patent: May 9, 1989

[54] PHASED-ARRAY EQUIPMENT

[75] Inventors: Ulrich Saugeon, Nürnberg; Gert Hetzel; Dietmar Hiller, both of Erlangen, all of Fed. Rep. of Germany

[73] Assignee: Siemens Aktiengesellschaft, Berlin and Munich, Fed. Rep. of Germany

[21] Appl. No.: 745,969

[22] Filed: Jun. 17, 1985

[30] Foreign Application Priority Data

Jul. 12, 1984 [DE] Fed. Rep. of Germany ....... 3425705

[51] Int. Cl.[4] .............................................. G01S 15/08

[52] U.S. Cl. ..................................... 367/103; 367/105

[58] Field of Search ............................ 367/105, 103, 7; 128/660; 73/626

[56] References Cited

U.S. PATENT DOCUMENTS

| | | | |
|---|---|---|---|
| 4,080,838 | 3/1978 | Kuroda et al. | 367/103 |
| 4,116,229 | 9/1978 | Pering | 367/105 |
| 4,127,034 | 11/1978 | Lederman et al. | 367/7 |
| 4,173,007 | 10/1979 | McKeighen et al. | 367/103 |
| 4,180,790 | 12/1979 | Thomas | 367/105 |
| 4,208,916 | 6/1980 | Thomenius et al. | 73/626 |
| 4,237,737 | 12/1980 | Nitadori | 367/7 |
| 4,330,875 | 5/1982 | Tachita et al. | 367/105 |
| 4,643,028 | 2/1987 | Kondo et al. | 367/105 |

FOREIGN PATENT DOCUMENTS

| | | |
|---|---|---|
| 0027618 | 7/1983 | European Pat. Off. . |
| 2736310 | 3/1978 | Fed. Rep. of Germany . |
| 2950461 | 6/1980 | Fed. Rep. of Germany . |
| 3004689 | 10/1980 | Fed. Rep. of Germany . |
| 2854134 | 4/1983 | Fed. Rep. of Germany . |
| 2399661 | 3/1979 | France . |
| 2053476 | 7/1980 | United Kingdom . |

OTHER PUBLICATIONS

"A new delay technique with application to ultrasound phased-array imaging systems", by Manes et al., Ultrasonics, Sep. 1979.

"Hybrid time-delay/phase-shift digital beamforming for uniform collinear arrays", by Gabel et al., Journal of the Acoustical Society of America, Jun. 1984.

*Primary Examiner*—Thomas H. Tarcza
*Assistant Examiner*—Daniel T. Pihulic
*Attorney, Agent, or Firm*—Lawrence C. Edelman

[57] ABSTRACT

Phased-array apparatus has a number of ultrasonic transducer elements (E1 to E64) to which are associated delay line elements (M1, T1 to M64, T64, W1-1, W1-2, N1 to W16-1, W16-2, N16; W1 to W16; VL1 to VL64, VR1 to VR16) to provide reception. In order that the control angle may be adjusted with high accuracy, according to the inventive principles delay line elements are provided for the received signals with a short and with a long delay, and several adjacent channels are combined for signal processing. Due to this arrangement, economical constructions of embodiments of the invention are realized.

9 Claims, 3 Drawing Sheets

PHASED-ARRAY EQUIPMENT

BACKGROUND OF THE INVENTION

The invention relates to a phased-array apparatus, and, more particularly, this invention relates to such apparatus for providing ultrasonic scanning of an object.

In phased-array equipment, that is, an electronic sector scanner, the change of signal delay of the individiual ultrasonic transducer elements in the case of transmitting and receiving must take place in very small steps to avoid errors in the adjustment of the control angle. Due to the fact that the typical maximum control angle is generally ±45° relative to the normal of the transducer element array, large control angles require relatively long delay times, whose length depends moreover greatly on the selected aperture length (length of the active antenna). To compensate the change of resolution with the depth because of the limited definition of the focussed aperture, it is desirable to adapt the receiving focus concomitantly.

The conventional technique provides the adjustment of the delay times by means of inductive - capacitive delays or LC delay lines which are equipped with setting taps. This relatively inexpensive solution is suitable especially for short delay times, i.e. for non-sweeping or non-deflecting, e.g. a linear array. With longer delay times the LC delay lines have a band-limiting effect for higher frequencies. They constitute, therefore, a low pass filter whose cutoff frequency may be about 5 MHz. At the same time, component tolerances greatly affect the accuracy of the entire delay. For this reason, LC delay lines for transducer frequencies are generally used only to about 3.5 MHz. This technique is referred to also as the "baseband technique.".

Higher transducer frequencies can be processed with the aid of LC delay lines by down-mixing to an intermediate frequency below 3.5 MHz. The down-mixing technique, however, presupposes a constant signal bandwidth and transmitting pulse length of the individual transducer signals. But in the interest of good resolution, the transmitting pulse time length should be changed, i.e. reduced, when changing over to high transducer frequencies.

Another possible technique is provided by the surface wave filter technology of SAW filter technology (see e.g. Ultrasonics, Vol. 17, pp. 225–229, Sept. 1979). Here it is necessary to mix the received signal of the individual ultrasonic transducer element upward, so as to get into the high frequency band of 20–50 MHz required in the SAW technique. After the summation of the individual received signals of the phased-array, down-mixing is necessary. Disadvantages of the SAW technique are the fact that in each channel upwardmixers must be employed, involving considerable expense, and the problems of obtaining a sufficiently fine graduation of the delay times in the SAW filters.

Upward and downward mixing operations in connection with a phased-array equipment are kown. For example, German Patent No. 28 54 134 in FIG. 11 discloses such mixing operations. Digital delay technology in a phased-array equipment is also described in European Patent No. 0.027,618, in particular in FIGS. 1 and 2.

In the design of phased-array equipment also the following viewpoints must be considered:

If it is assumed, for example, in a medical test a center frequency of the received spectrum of $f_s=3.5$ MHz and if we consider theoretically a band width $\Delta f=f_s$ (2 lambda pulse), we obtain as maximum frequency $f_{smax}=f_s+\Delta f/2=1.5\ f_s=5.25$ MHz. From this results, according to Shannon's theorem, a scanning frequency for the individual ultrasonic transducer element of $f_a \gtrsim 2\ f_{smax}=3\ f_s 10.5$ MHz. This scanning frequency $f_a$, therfore, is the minimum frequency for being able to reconstruct the individual signal of a transducer element.

For the quantization of the phase, i.e. for a sufficient accuracy of the time delay between two adjacent transducer elements, scanning with at least 1/8 of the wavelength is necessary. This results in a quantized phase shift within the wavelength lambda of 360°/8=45° or (±22.5°). At a center frequency $f_s=3.5$ MHz one obtains therewith a time delay of 35.7 nsec, i.e. ±17.9 nsec. This accuracy of phase or time requires a scanning frequency $f_a>28$ MHz if the signal is to be processed digitally (see European Patent No. 0,027,618). This high scanning frequency currently requires the use of emitter - coupled logic or ECL components and leads to a relatively expensive phased-array equipment.

A way out of this velocity problem is the quadrature technique (cf. German Patent, N28 54 134, FIG. 8), where two delay channels phase shifted by 90° are made use of. Here the minimum scanning frequency is $f_a=10.5$ MHz. It permits the use of energy-saving techniques (e.g. HCMOS, Low Power Schottky). The quadrature technique, however, involves a relatively high expense, as it requires two channels per transducer element for signal processing.

It is the object of the invention to provide a phased array equipment which provides high accuracy in the adjustment of the control angle in an, economic way.

SUMMARY OF THE INVENTION

According to the principles of the invention, this problem is solved in that the delay line elements provide the received signals with a short delay and with a long delay. It is then possible to combine several adjacent channels, e.g. four, for the signal processing.

One embodiment of the invention is characterized in that the ultrasonic transducer elements are connected to first delay line elements for analog fine delay of the received signals, that a given number of the first delay line, elements are connected to a common integrator, that the output signals of the integrators are supplied to second delay line elements for coarse delay, and that the output signals delivered by the second delay line elements are supplied to a digital adder, at the output of which a sum signal is delivered which is provided for image display.

A second embodiment of the invention is characterized in that the ultrasonic transducer elements are followed by an attenuation compensation or TGC, amplifier and an analog-digital converter component.

A feature of the invention is that the respective control angle can be adjusted very accurately because of the use of components with fixed component-specific delay times (tolerances) and because of the digital storage devices, specifically some shift registers Drifting of the delay need not be feared even after prolonged use of the phased-array equipment. As a result of the high accuracy in the adjustment of the control angle, also a high accuracy in focusing and hence high resolution is obtained. This is of special interest when applying concomitant focusing in the case of receiving.

BRIEF DESCRIPTION OF THE DRAWING

The foregoing and other objects and features of this invention will be more fully understood from the following description of illustrative embodiments of the invention. In the drawing.

DETAILED DESCRIPTION

Figure 1:
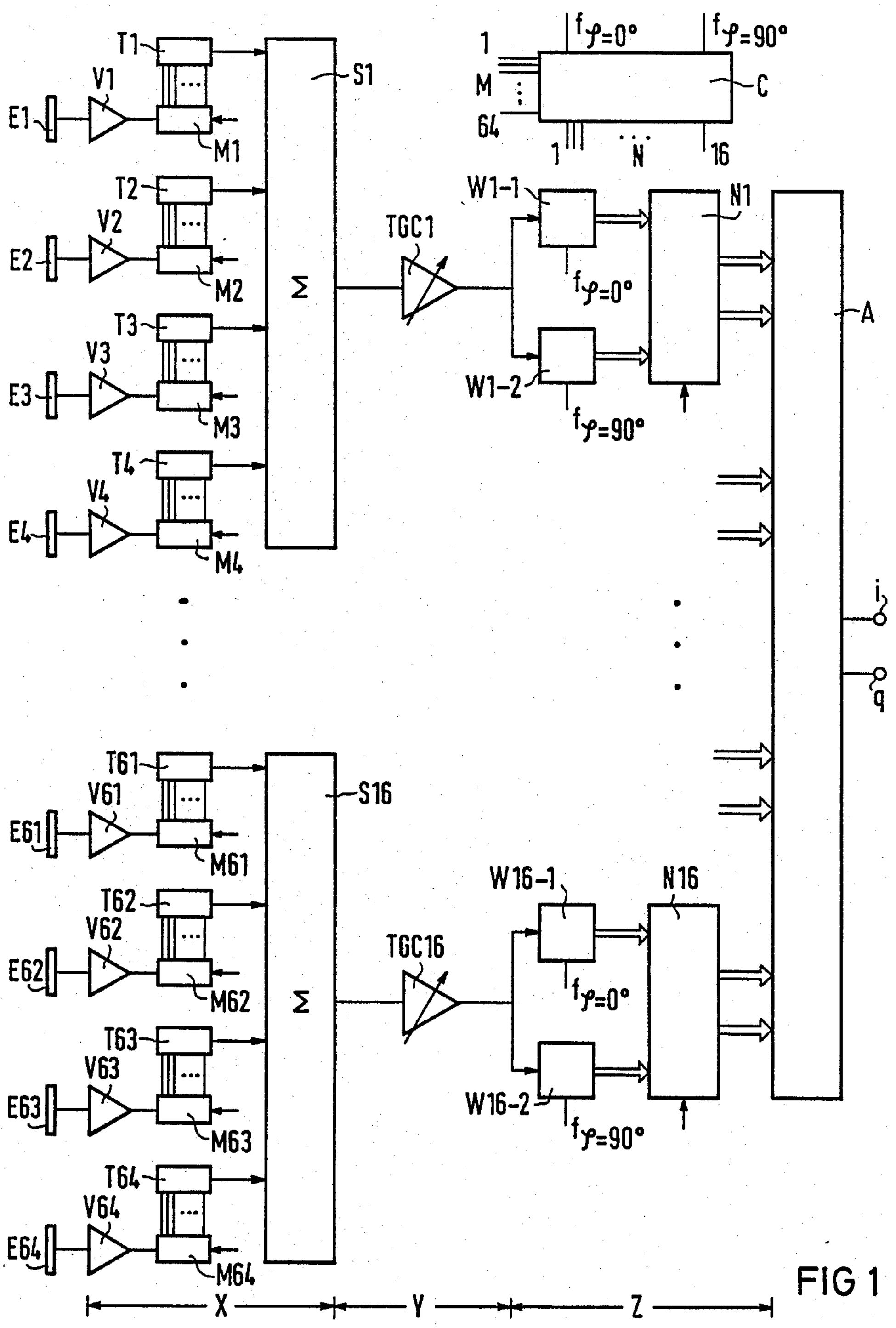
FIG. 1 illustrates a first illustrative embodiment where analog as well as digital delays are used.

The phased-array equipment according to FIG. 1, which is employed in particular for medical image representation, comprises a plurality of individual ultrasonic transducer elements E1, E2, . . . E64, which serve for the emission as well as for the reception of ultrasonic signals. In FIG. 1 only the receiving section of the phased-array equipment is shown. In such equipment, the received ultrasonic signals must be delayed with the foregoing described high accuracy. To avoid antenna-grid interferences (side lobes or grating lobes) and to obtain sufficient resolution, the number of ultrasonic transducer elements should be large. As a favorable compromise, the number 64 at an element spacing of lambda/2 is adequate in the present instance.

To keep expenses down that would result with the adoption of a delay concept with the above stated phase accuracy, received ultrasonic signals are provided with a short and with a long delay according to FIG. 1. This makes it possible to combine adjacent signal processing channels. As will be evident later, in FIG. 1 always four channels are combined.

According to FIG. 1, the equipment contains a mixed delay technique, namely an analog predelay and a digital main delay. This, therefore, is a hybrid solution. The analog predelay is a fine delay. It takes place in a zone marked X. In this zone X, a total of 64 channels are provided. The fine delay takes place between 0 and 2 lambda. After zone X, a zone Y follows which comprises only 16 channels.

Incorporated within this zone Y are variable gain amplifiers depending on depth, also known as time gain control (TGC) amplifiers. After zone Y follows a zone Z, also comprising 16 channels. Here a relatively long time delay occurs.

Experiments have shown that in medical examinations with an electronic sector scanner total delay times ranging from 6 to 12 microseconds are required. In the present case, based on these values, the fine delay in zone X takes up a delay of 0 to 600 nsec, and the coarse delay in zone Z takes up a delay between 5.4 and 11.4 μsec.

According to FIG. 1, each ultrasonic transducer element E1 to E64 is followed by a preamplifier V1 to V64 with fixed gain. To these preamplifiers V1 to V64 is connected in turn a multiplexer M1 to M64. The respective multiplexer M can be actuated from a control device C with clock pulses, this being indicated by an arrow at the respective block M1 to M64. Associated with each of the multiplexers M1 to M64 is an analog predelay element T1 to T64. Its delay time, in particular in the range of 0 to 600 nsec, can be adjusted by means of the respective multiplexer M1 to M64. The delay elements T1 to T64 may each include inductive - capacitive lines or LC lines with a number of taps, e.g. 16 taps. With such LC lines a delay is obtained which is sufficiently exact for the present purposes.

By means of the multiplexers M1 to M64, therefore, the fine delay is switchable dynamically, i.e. during reception of each ultrasonic row. In this way, dynamic focusing can be achieved.

The signal processing of groups of four adjacent ultrasonic elements E1 to E64 is combined in the present case. For this purpose, the delay elements T1 to T4 are, for example, connected to a common summing element S1. Similarly e.g. also the delay elements T61 to T64 are connected to a common summing element S16. As has been stated, the fine delay comprises the duration of at least 2 lambda, so as to be able to combine always four such adjacent elements. The value 2 lambda is an empirically found magnitude. It represents a compromise which can be used for most ultrasonic applicators operating on the phased-array principle. Instead of four channels, it would be possible also to combine two, six, or eight channels. After the summation of the signals of the combination of four adjacent channels in the summing elements S1 to S16, the combined received signal thus obtained is amplified dependent on depth which produces attenuation by means of attenuation compensation amplifiers TGC1 to TGC16, in order subsequently to be able to utilize the A/D converter dynamic.

Figure 2:
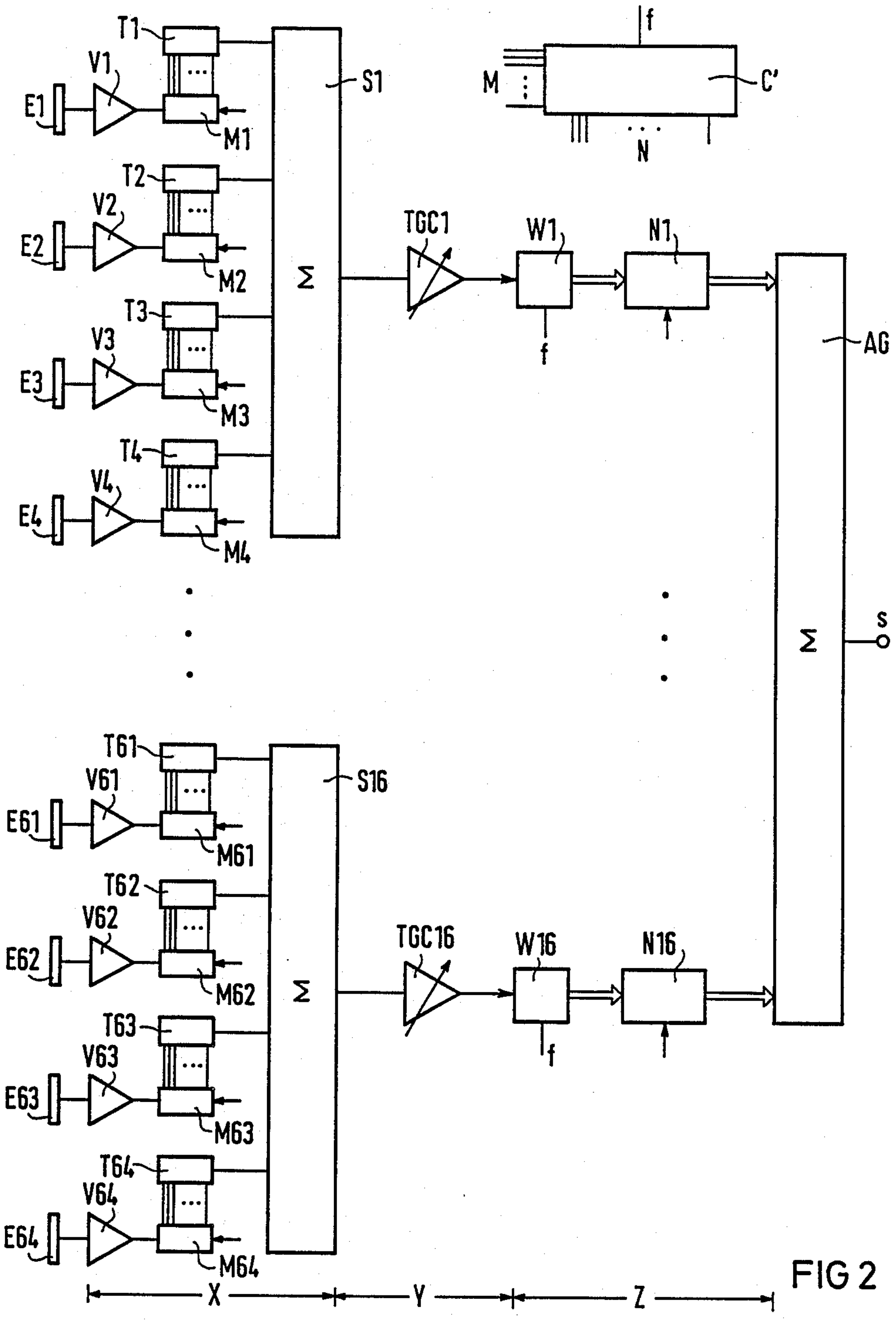
FIG. 2 is a second illustrative embodiment of simpler construction as compared with the embodiment according to FIG. 1.

After the amplification in the amplifiers TGC1 to TGC16 two possibilities of realization are available, which are shown separately in FIGS. 1 and 2. According to FIG. 1, the received signal is scanned by the quadrature method, i.e. in complex form. Owing to this the phase accuracy of the entire delay unit remains constant, e.g. lambda/12, when $f_a = f_{aq}$.

Specifically, according to FIG. 1, the output signal of amplifier TGC1 is supplied to a delay section which consists of a memory N1 and two analog/digital converters W1-1 and W1-2 preceding it. The first converter W1-1 is actuated by a clock frequency f, which is equal for example to the initially mentioned scanning frequency $f_a = 10.5$ MHz. The second W1-2 is pulsed with the same clock frequency, but the clock signal is shifted by 90° relative to that of the first converter W1-1. This is expressed by designating the frequencies with f(phi=0°) and f(phi=90°), respectively. The two converters bring about a division of the received signal into a real and an imaginary part. Converter W1-1 creates the inphase term or cosine component, while converter W1-2 offers the quadrature term or sine component. The connected storage device N1 is preferably a shift register. It is scanned e.g. in lambda/8 steps, for which appropriate control pulses are fed to it from the control device C.

The coarse delay elements, connected after the additional amplifiers TGC2 to TGC16, are constructed accordingly. In all, therefore, there are 16 memories or storage devices N1 to N16. On the output side they are jointly connected to an adder A. The storage devices N1 to N16, in cooperation with the preceding analog/-digital converters W1-1 to W16-2, thus serve for long time delay. With their aid in particular the sweep or the deflection angle in a phased-array equipment can be adjusted.

The output signal of adder A includes an imaginary fraction i and a real fraction q, that is, it is complex. From these two fractions i and q it is possible to generate the absolute value of the signal according to the relation $\sqrt{i^2+q^2}$ which can be represented on a screen.

The form of realization of FIG. 2 is largely similar to that of FIG. 1. Here, however, the second delay elements are of a different, i.e. simpler design. This simplified form produces a certain waviness or ripple, which, it should be noted, is immaterial for the image quality. As distinguished from FIG. 1, the combined received signal is scanned, not by the quadrature method, but in individual channels. For this purpose there is present in each channel a serial connection of an analog/digital converter W1 to W16 with a storage device N1 to N16 controlled by a control unit C'. The analog/digital converter W1 to W16 is actuated by the control unit C' with a scanning frequency f. The latter is preferably somewhat higher than the previously stated value of 10.5 MHz. But theoretical studies have shown that the frequency f may be below 20 MHz. The phase accuracy of the digital chain is determined by the scanning frequency $f=f_a$. At a scanning frequency $f_a=20$ MHz one obtains for example a phase accuracy of lambda/5.

According to the literature in a reference of G.F. Manez; entitled "Design of a simplified delayed system for ultrasound phased array imagining" in IEEE Transactions on Sonics and Ultrasonics, Vol. SU-30, No. 6, page 350 f, for the individual delay elements W1, N1 to W16, N16 a coarser quantization of the delay is sufficient if the carrier is delayed accurately enough by a fine delay. This is the case in the present instance by the fine delay in zone X.

At the output of the adder A connected to the delay elements W1, N1 to W16, N16 a value signal s automatically results which corresponds to the value $s=\sqrt{i^2+q^2}$ in FIG. 1.

Figure 3:
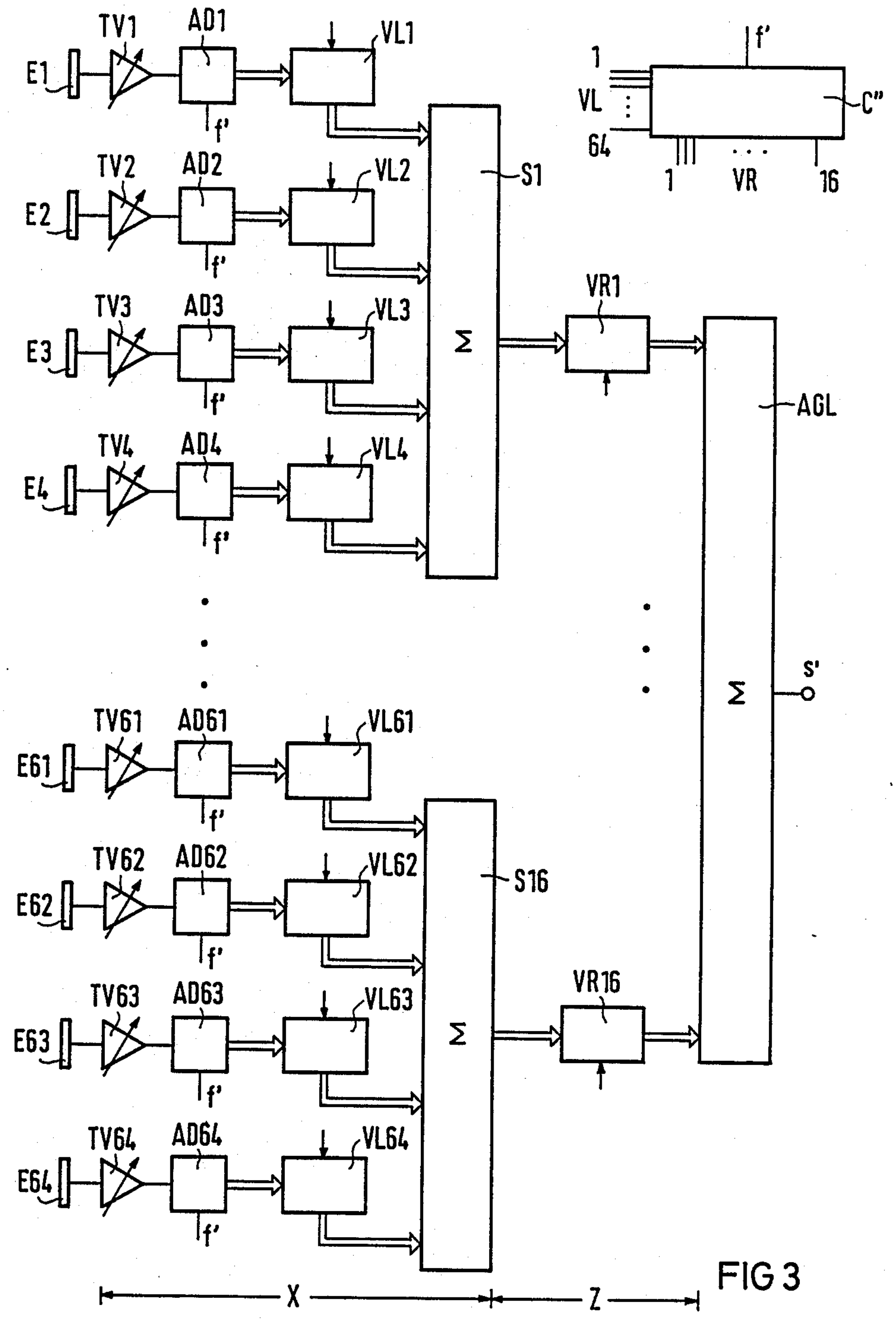
FIG. 3 depicts a third illustrative embodiment of the invention which is based on a wholly digital delay concept.

FIG. 3 shows a fully digitalized embodiment of the inventive delay concept, where in a phased-array equipment the delay is again subdivided into a fine delay (see zone X) and a coarse delay (see zone Z). In the present embodiment again 64 channels are provided in zone X of the fine delay, while only sixteen processing channels are provided in the then following coarse delay zone Z.

According to FIG. 3, the 64 ultrasonic transducer elements E1 to E64 (with exclusively digital realization of the delay) are each followed by one of depth compensation or TGC amplifiers TV1 to TV64. These attenuation compensation amplifiers are adjustable and correspond to the amplifiers TGC1 to TGC16 of FIGS. 1 and 2. Thus the received signal of each element E1 to E64 is amplified depending on depth. It is subsequently digitalized by means of an analog/digital converter AD1 to AD64. In the present instance these analog/digital converters AD1 to AD64 are operated at a higher frequency than those in FIGS. 1 and 2, for example at a frequency f' of 28 MHz, to be able to work with lambda/8. Such a high frequency means, however, that the components should be laid out in emitter-coupled logic or ECL technology. It is here assumed, therefore, that the A/D conversion is carried out with relatively high scanning frequency, which may even be higher than 28 MHz. As an alternative, it may be carried out by the quadrature method; this is not shown in FIG. 3.

To reduce the cost of digital elements, in particular bus lines, in the present purely digital solution a division is made into a fine delay with the aid of 64 shift registers VL1 to VL64 and a coarse delay with the aid of 16 shift registers VR1 to VR16. The shift registers VL1 to VL64 and VR1 to VR16 are in particular shift registers of variable length. Here, for example, each of the shift registers VL1 to VL64 may comprise a total of 16 stages or steps, while each of the shift registers VR1 to VR16 contains a quadruple number of these 16 stages or steps. In other words, the same basic components can be used in both types of shift registers.

As to function, the shift registers VL1 to VL64 correspond to a combination of the multiplexers M1 to M64 and of the time delay elements T1 to T64 of FIG. 1. The outputs of four such shift registers, e.g. VL1 to VL4, belonging to adjacent ultrasonic transducer elements, e.g. E1 to E4, are jointly connected to a summing element, S1 to S16. Instead of four channels being combined in each instance, another number, e.g. eight channels, may be selected. The delay times of the individual shift registers VL1 to VL64 can be varied by computer control during reception of an ultrasonic row, in particular to achieve dynamic focusing. For this purpose their control inputs are connected to a control unit C''.

It should be noted, therefore, that with the aid of summing elements S1 to S16 here too a given number of data channels is combined.

The outputs of the individual summing elements S1 to S16 are connected to an adder AGL via an associated shift register VR1 to VR16, respectively, which bring about the longer of the two delays. The adder AGL adds up to the individual and combined delayed signals. At its output an output signal s' is formed which, compared with that of FIGS. 1 and2, is at high frequency. This high-frequency output signal s' corresponds to the absolute value and can be used for image representation. Alternatively the two signal components i and q could be derived from this high-frequency output signal s'.

Also with the form of construction in accordance with FIG. 3, a precise adjustment and control of the delay results. Here, too, the deflection may also be adjusted by way of the delay elements for the coarse delay preceding the adder AGL, i.e. the shift registers VR1 to VR16.

It should therefore be understood that numerous modifications and variations of the illustrative embodiments presented in the foregoing may be devised by those skilled in the art while employing the inventive principles. Accordingly, such modifications and variations are understood to fall within the spirit and scope of the invention which is only limited by the following claims.

What is claimed is:

1. Phased-array apparatus for the ultrasonic signal scanning of an object, the apparatus including a number of ultrasonic transducer elements each associated with delay line elements for providing a correct and independently adjustable beam steering and dynamic focusing delay at least for reception, characterized in that first delay line elements are connected to ultrasonic transducer elements for analog fine delay of the received signals, which delay partially provides for dynamic focusing and beam steering during reception, that respective common summing elements each having an output signal are connected to given numbers of adjacent ones of said first delay line elements, that second delay line elements which provide digital coarse delay and accomplish the remainder of the correct dynamic focusing and beam steering during reception are connected to the output signals of the common summing elements, and that a digital adder is connected to the second delay line elements to provide a sum signal output suitable for image representation.

2. Phased-array apparatus according to claim 1, further characterized in that said fine delay corresponds to at least the time which is required for passing two lambda, where lambda is the wavelength of the ultrasonic signals.

3. Phased-array apparatus according to claim 1, further characterized in that at least one of said first delay line elements comprises an LC line controlled by a multiplexer.

4. Phased-array apparatus according to claim 1, further characterized in that at least one of said second delay line elements comprises a storage device preceded by two analog/digital converters, which are controlled with clock signals of given frequency which are phase-shifted relative to each other by 90°.

5. Phased-array apparatus according to claim 1, further characterized in that at least one of said second delay line elements comprises a storage device preceded by two analog/digital converter, which is controlled with clock signals of a predetermined scanning frequency.

6. Phased-array apparatus for the ultrasonic scanning of an object, the apparatus including a number of ultrasonic transducer elements each associated with delay line elements for providing a correct and independently adjustable beam steering and dynamic focusing delay at least for reception of ultrasonic signals, the apparatus comprising: an attenuation compensation amplifier and an analog/digital converter following each one of the ultrasonic transducer elements, a fine delay line for partially providing the correct delay for dynamic focusing and beam steering during reception of said ultrasonic signals following each analog/digital converter, a summing element connected to selectd numbers of the fine delay line elements, a coarse delay line element connected to each of the individual summing units for providing the remainer of the correct delay for dynamic focusing and beam steering, and a common adder connected to the individual summing units to provide an output signal suitable for image representation.

7. Phased-array apparatus according to claim 6, further characterized in that the analog/digital converter is an analog/digital converter which is scanned at a scanning frequency corresponding to at least lambda/8, wherein lambda is the wavelength of the received ultrasonic signals.

8. Phased-array apparatus according to claim 6, further characterized in that the analog/digital converter is configured according to a quadrature technique.

9. Phased-array apparatus according to claim 6, further characterized in that the fine delay line element comprises a shift register of variable length.

* * * * *